United States Patent [19]  [11] 4,182,743
Rainer et al.  [45] Jan. 8, 1980

[54] FILTER MATERIAL FOR SELECTIVE REMOVAL OF ALDEHYDES FOR CIGARETTE SMOKE

[75] Inventors: Norman B. Rainer; Irvin R. Feins, both of, Richmond, Va.

[73] Assignee: Philip Morris Incorporated, New York, N.Y.

[21] Appl. No.: 773,866

[22] Filed: Mar. 3, 1977

Related U.S. Application Data

[63] Continuation-in-part of Ser. No. 630,355, Nov. 10, 1975, abandoned.

[51] Int. Cl.² ............................................. B01D 53/34
[52] U.S. Cl. .................................... 422/211; 131/265
[58] Field of Search ............... 422/211; 423/245, 224, 423/230; 252/186; 131/4 R, 10.9, 10 R, 10.7, 141, 142 R, 143, 269, 268, 267, 266, 265, 264

[56] References Cited

U.S. PATENT DOCUMENTS

| | | | |
|---|---|---|---|
| 3,390,688 | 7/1968 | Touey et al. | 131/266 |
| 3,434,479 | 3/1969 | Till et al. | 131/10.9 |
| 3,480,557 | 11/1969 | Shiraeff | 252/186 |
| 3,755,185 | 8/1973 | Waldmann et al. | 252/186 |
| 3,911,080 | 10/1975 | Mehl et al. | 423/245 |

OTHER PUBLICATIONS

Tobacco & Tobacco Smoke by Wyndor et al Publ. 1967 by Academic Press pp. 596–599 and 602–603.

Primary Examiner—Robert W. Michell
Assistant Examiner—V. Millin
Attorney, Agent, or Firm—Jr. Palmer; George E. Inskeep; Susan A. Hutcheson

[57] ABSTRACT

A gas-permeable substrate, particularly adapted for the selective removal of aldehydes from gases, comprising a granular carrier containing concentrated hydrogen peroxide, water and a hydrophilic stabilizer for said hydrogen peroxide.

10 Claims, No Drawings

FILTER MATERIAL FOR SELECTIVE REMOVAL OF ALDEHYDES FOR CIGARETTE SMOKE

RELATED APPLICATIONS

This application is a continuation-in-part application of application Ser. No. 630,355, filed Nov. 10, 1975 now abandoned.

BACKGROUND OF THE INVENTION

This invention relates to improvements in gas filters and, more particularly, to a novel filter for the removal of selected oxidizable vapors from tobacco smoke.

It is often desirable to remove lower molecular weight aldehydes, such as acetaldehyde and acrolein, from gases without, at the same time, removing organic components containing double and triple bonds. There are numerous instances in laboratory and industrial applications wherein the selective removal of lower molecular weight aldehydes (and related compounds, such as corresponding alcohols, etc.) from gas streams while leaving the unsaturated hydrocarbon components thereof undisturbed is desirable. For example, in the free-radical catalyzed polymerization of ethlenically unsaturated monomers to produce high molecular weight polymers, traces of aldehyde and alcohol impurities in the feed stream interfere with the chain-propagating nature of the polymerization reaction. The consequence of such interference is the production of polymers having inferior properties, or the need to utilize larger quantities of relatively expensive catalyst.

Tobacco smoke, as produced by cigarettes, pipes, and cigars, is essentially an aerosol consisting of droplets and/or particles dispersed in a gaseous stream. The dispersed droplets and/or particles are generally referred to as the total particulate matter (TPM) of the smoke. The TPM can generally be removed in part from the smoke stream, if desired, by filtration devices attached to the smoking article which function to mechanically intercept and retain the suspended material. If complete removal of TPM is desired, as in analytical studies of the smoke, a standard Cambridge filter pad may be employed, which consists of a 1 mm thick circular matt of 45 mm diameter made of extremely fine diameter glass fibers. The portion of the smoke which passes through the Cambridge pad, under standard testing conditions, is referred to as the gas phase of the smoke.

Both the TPM and gas phase portions of tobacco smoke consist of a complex mixture of components which, collectively, produce the taste and aroma sensations sought and appreciated by those individuals who indulge in the smoking pastime. Some of the constituents of the smoke, however, do not have a beneficial effect on the subjectively perceived quality of the smoke and could be considered undesirable from a physiological standpoint. In this category are the low molecular weight aldehydes such as acetaldehyde and acrolein, which occur in small quantities in the gas phase of smoke derived from tobacco and cellulose-based tobacco substitutes.

A considerable amount of earlier work has been directed toward the removal of gas phase components from cigarette smoke. One general approach has been to provide a bed of granules of an active material in a compartment of a cigarette filter, through which the smoke passes. The most often mentioned active granular filter materials are silica gel and activated carbon. These materials, although capable of removing aldehyde compounds, are nonselective in their effect, and remove numerous other compounds considered necessary for acceptable flavor.

DISCUSSION OF PRIOR ART

Although there has been disclosed in U.S. Pat. No. 3,424,168 a material which can remove acetaldehyde from a stream of nitrogen, its effectiveness with actual cigarette smoke is unknown because of the multitude of interfering species present in tobacco smoke.

U.S. Pat. No. 3,755,185 discloses stable mixtures of N-heterocyclic compounds and hydrogen peroxide but does not disclose their efficacy for the selective removal of aldehydes from gas streams. In addition, only an anhydrous system is disclosed by the patent.

U.S. Pat. Nos. 3,191,723 and 3,327,715 disclose the inclusion of polyvinylpyrrolidone in cigarette filters; however, not for the purpose of stabilizing hydrogen peroxide or aiding in the removal of aldehydes from cigarette smoke passing therethrough.

U.S. Pat. No. 3,359,990 discloses the use of monomeric hydrazides in filter media for the removal of aldehydes from cigarette smoke.

U.S. Pat. No. 3,911,080 describes an elaborate structure for removing aldehydes from gas streams comprising an aqueous solution of hydrogen peroxide or other oxidizing or reducing agent encased in a cell composed of a liquid impermeable, gas permeable membrane. The utility and applications of such a unit are necessarily restricted by the semi-permeable nature of the membrane enclosure walls thereof which severely limit the rate of gas flow therethrough.

It is an object of the present invention to provide a filter capable of selectively abstracting low molecular weight aldehydes and related species from a gas stream.

It is a further object of the invention to provide such a filter having a simple construction and not requiring encapsulation in a liquid impermeable envelope. It is another object to provide a filter material capable of removing aldehydes from tobacco smoke. It is still another object to provide a cigarette containing a filter section at one end containing a material capable of selectively removing aldehydes from tobacco smoke. Other objects and advantages will become apparent hereinafter.

SUMMARY OF THE INVENTION

The objects of this invention are accomplished in general by providing a gas-permeable substrate consisting essentially of a porous, granular carrier containing hydrogen peroxide, water and a hydrophilic stabilizer for said hydrogen peroxide. Said hydrogen peroxide and stabilizer are preferably substantially homogeneously distributed within said substrate.

DETAILED DESCRIPTION OF THE INVENTION

Suitable gas-permeable substrates which may be employed include beds of porous, granular substances. The substrate should be comprised of materials substantially inert to hydrogen peroxide.

Granular substances which may be employed in forming a gas-permeable bed may consist of (A) inorganic substances such as silica gel, alumina, magnesia, calcium sulfate, diatomaceous earth, perlite and still other inorganic substances or (B) organic substances such as polyolefins, polyacrylates, polymethacrylates, polyvinyl chloride, polyphenyl, polyphenylether, cellulose, polystyrene, polyvinylpyrrolidone and still other organic substances. The granular substance should be relatively inert to hydrogen peroxide and should be porous, in the sense described above, to the extent of having a pore volume between about 0.1 and 2.5 cc per gram of granular material.

When the granules are utilized as a gas permeable bed in a cigarette filter, they should have a size ranging from about 10–100 mesh (U.S. Sieve Series, ASTME-11-61) and preferably a range of 20–60. In expressing granule size by mesh numbers, it is to be understood that each range signifies that granules will pass through the coarser sieve designated (the smaller sieve number) and will be retained on the finer sieve designated (the larger sieve number). Granules having a size finer than about 100 mesh generally impart too high an impedance to gas flow. Granules larger than about 8 mesh provide reduced efficiency of removal of aldehydes.

In preparing the filter material of this invention, commercially available aqueous solutions containing 3% to 70% $H_2O_2$ may be utilized to produce the requisite concentrated form of hydrogen peroxide. In most instances, the aqueous hydrogen peroxide solution can be mixed with a stabilizing agent to form a homogeneous solution which is then applied to a gas-permeable substrate. Either prior to or after application of the solution to the substrate, the solution is subjected to dehydrating conditions which remove most of the water from the solution, causing an increase in the concentration of the hydrogen peroxide. The concentration of hydrogen peroxide in the dehydrated solution will be in the range of 20% to 90%, and preferably 30% to 70%.

The hydrogen peroxide solution can be applied to the substrate by known methods such as spraying, immersion, etc.

The removal of water from the aqueous peroxide solution can be carried out either before or after the peroxide solution is applied to the gas-permeable substrate. The water can be removed by known methods such as evaporation distillation, preferably at reduced pressure; freeze-drying techniques; contact with anhydrous inert sweep gases; exposure to dehydrating agents, particularly those which form hydrated salts; azeotropic distillation using liquids such as benzene, toluene and xylene, and other equivalent methods.

It is preferred that the water be removed from the peroxide solution after the solution is either made to contain a dissolved stabilizing substance, or is applied to a stabilizing substrate. Removal of water is carried out until there is less than about 30%, and preferably less than about 20% water remaining in the peroxide phase. The peroxide phase, following removal of water to the extent indicated, may exist as a liquid or solid phase on or in the gas-permeable substrate. For example, when the stabilizing agent is a liquid, a solution of hydrogen peroxide in said liquid will be produced. When the stabilizing agent is a film-forming polymer, a solid film may be produced which contains, homogeneously distributed therein, hydrogen peroxide. When the stabilizing agent is a solid material, the resultant hydrogen peroxide will exist either as an adsorbed layer on the stabilizing solid, or will be diffused into said solid to some extent.

It is to be understood, however, that some water must remain in the substrate, either in solution form or as water of crystallization. The precise reasons behind ensuring the continued presence of water in the system are not completely understood. It has been found, however, that if the hydrogen peroxide is allowed to become anhydrous in the substrate, its stability and efficiency as an absorber of aldehydes from gas streams is greatly impaired.

Generally, it has been found that the presence of at least about 1%, and up to about 10%, by weight, of water, based on the weight of hydrogen peroxide, should be present in the substrate.

Liquid stabilizing agents which may be employed in the practice of this invention include organic compounds having a lower volatility than $H_2O_2$ and possessing a saturated nitrogen heterocyclic ring of 4 to 7 members, said ring containing an endocyclic or exocyclic carbonyl group adjacent to the nitrogen heteroatom. The compounds may be characterized as either N-substituted lactams of the general formula I or N-acylated cyclic bases of the general formula II

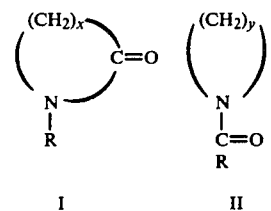

I    II in which R represents a straight chain or branched $C_1$–$C_4$ alkyl radical which may be substituted with one or more of halogen, hydroxy or $C_1$ to $C_3$ alkoxy group, x represents the integer 2, 3, 4 or 5, and y represents the integer 3, 4, or 5.

R may represent the following substituted or unsubstituted alkyl radicals: Methyl, ethyl, n-propyl, isopropyl, n-butyl, isobutyl, sec.-butyl, tert.-butyl, chloromethyl, 2-chloroethyl, 3-chloropropyl, 2-chloropropyl, 1-chloropropyl, hydroxymethyl, 2-hydroxyethyl, 3-hydroxypropyl, 2-hydroxypropyl, methoxymethyl, 2-methoxyethyl, 3-methoxypropyl and 2-methoxypropyl. The halogen substituents may be fluorine, chlorine or bromine.

The following are mentioned as specific examples of compounds of formulae (I) and (II): N-methylpropiolactam, N-ethylpropiolactam, N-isopropylpropiolactam, N-butylpropiolactam, N-chloromethylpropiolactam, N-2-chloroethylpropiolactam, N-2-hydroxyethylpropiolactam, N-3-hydroxypropylpropiolactam, N-2-hydroxypropylpropiolactam and N-2-methoxyethylpropiolactam; N-methylpyrrolidone, N-ethylpyrrolidine, N-isopropylpyrrolidone, N-butylpyrrolidone, N-chloromethylpyrrolidone, N-2-chloroethylpyrrolidone, N-2-hydroxyethylpyrrolidone, N-3-hydroxypropylpyrrolidone, N-2-hydroxypropylpyrrolidone, N-2-methoxyethylpyrrolidone, N-methylvalerolactam, N-ethylvalerolactam, N-isopropylvalerolactam, N-butylvalerolactam, N-chloromethylvalerolactam, N-2-chloroethylvalerolactam, N-2-hydroxyethylvalerolactam, N-3-hydroxypropylvalerolactam, N-2-hydroxypropylvalerolactam, N-2-methoxyethylvalerolactam; N-methylcaprolactam; N-acetylazetidine, N-propionylazetidine, N-chloroacetylazetidine, N-hydroxyacetylazetidine, N-methoxyacetylazetidine; N-acetylpyrrolidine, N-propionylpyrrolidine, N-chloroacetylpyrrolidine, N-hydroxyacetylpyrrolidine, N-methoxyacetylpyrrolidine; and N-acetylpiperidine, N-propionylpiperidine, N-chloroacetylpiperidine, N-hydroxyacetylpiperidine and N-methoxyacetylpiperidine.

The liquid organic stabilizers should be soluble in, and preferably miscible with, 30% aqueous $H_2O_2$ solution.

Other relatively non-volatile organic liquid compounds which are soluble in 30% aqueous $H_2O_2$ solution and inert to $H_2O_2$ may be employed. Such compounds include nitrogen-containing heterocyclic compounds containing either two or more nitrogen atoms or two or more carbonyl groups, such as found in diketopiperazines. Certain silicone and fluorocarbon compounds and phosphate esters may also be utilized.

Solid stabilizers which may be utilized to form the essentially anhydrous hydrogen peroxide compositions of this invention include organic polymers which are soluble in 30% aqueous $H_2O_2$ solution and which are inert to $H_2O_2$. Preferred species of such solid stabilizer include polyvinylpyrrolidone and film-forming addition polymers derived from other vinyl-substituted lactams. In use, the polyvinylpyrrolidone or other soluble film-forming polymer is dissolved into the aqueous $H_2O_2$ solution, forming a solution which can be applied to a gas-permeable substrate. Upon removal of the water, a film of the polymer is deposited which contains the $H_2O_2$ homogeneously distributed therein.

Combinations of stabilizers may be utilized. For example, different liquid stabilizers may be used in admixture, or a liquid stabilizer may be employed in conjunction with the use of a solid stabilizer. Other substances may be incorporated into the hydrogen peroxide solution to function either as a stabilizer or to enhance the activity of the hydrogen peroxide for certain smoke components. Exemplary stabilizing agents include: sodium stannate, 8-hydroxyquinoline, zinc acetate, and inorganic phosphates. Other generally known chemical agents and physical factors which contribute to increased stability of hydrogen peroxide may be utilized, such as those disclosed in chapter 9 of "Hydrogen Peroxide" by Schumb, et al. Reinhold Publishing Corp., N.Y. (1955).

The weight loading of $H_2O_2$ on the gas permeable substrate should be at least about 2%, and can range as high as about 60%. Since the $H_2O_2$ is consumed by interaction with oxidizable species in the course of a filtering process, levels below 2% do not afford adequate filtration capacity. At loadings above about 60%, the porosity of the gas-permeable structure will generally be adversely affected.

In those instances where the gas-permeable substrate is a bed of porous granules, it is possible to blend said granules with other granules to secure modified effects. For example, granular mixtures for use in tobacco smoke filters may contain, in addition to peroxide-containing granulles of this invention, granules of activated carbon, silica gel, catalysts, flavorants, humectants, and other substances intended to bring about a beneficial modification of the smoke.

Although the preferred use of the peroxide-containing gas-permeable product of this invention is for cigarette filters, it can be utilized for residential or industrial air conditioning systems to remove unwanted odors, and also for the removal of potential pollutants from industrial effluent gas streams. A particularly useful application is in gas mask devices utilized for the protection of personnel breathing contaminated air.

The selectivity of the product of this invention for the removal of aldehydes is unexpected in view of the known high affinity of hydrogen peroxide for unsaturated compounds, many of which are responsible for the desirable aroma of tobacco smoke. For the purpose of further characterizing the product of this invention, the selectivity of the filter for cigarette smoke may be defined as the ratio of % reduction of acetaldehyde/% reduction of isoprene. Both of said smoke components are customarily determined by infrared or gas chromatographic methods. In the case of most active carbons utilized for cigarette smoke filtration, the value of the above-defined acetaldehyde/isoprene reduction ratio generally does not exceed 1.0. The selectivity obtained by use of the filter materials of this invention is greater than about 2.0, and frequently ranges above 20.

The content of hydrogen peroxide in the product of this invention may be ascertained by the iodimetric titration method described in "Hydrogen Peroxide" by Schumb et al., Reinhold Publishing Corp., N.Y. (1955), pps. 557–8. The water content of the product may be determined by the Karl Fisher tritration method described in "Hydrogen Peroxide" by Schumb et al., or by thermogravimetric analysis, or by difference when the amounts of the other components are known.

The following examples are given to illustrate the invention, it being understood that these examples are not intended to be limiting.

EXAMPLE I

A solution consisting of ten grams of 30% aqueous $H_2O_2$ containing one gram of N-methyl-2-pyrrolidone was applied to 10 grams of 20/40 mesh silica gel granules having a pore volume of 1.8 cc/gram (grade 59, manufactured by the Davison Chemical Co., Baltimore, Maryland). The addition of the solution was carried to the point where the silica gel became saturated with the solution and enough excess was present so that run-off of the solution was just barely apparent. The saturated granules were dried in a vacuum oven operated at 0.5 mm Hg pressure and 21° C. The impregnation and drying operations were then repeated.

The resultant dried granules contain 23% by weight of $H_2O_2$ with 6% of water based on peroxide weight. The calculated concentration of $H_2O_2$ in the N-methyl-2-pyrrolidone liquid stabilizer is 75%, based upon the assumption that the vacuum evaporation removed only water. The dry granules are white, opaque and free-flowing.

The granules were utilized in cigarette filters in the following manner: 260 mg of the granules were weighed out and placed in a space 8 mm long bounded by two 6 mm length plugs of standard cellulose acetate tow rod having a total denier of 40,000, and consisting of individual filaments of 6 denier per filament. The filter assembly was wrapped with a standard tipping paper, forming a cylindrical filter of 20 mm length and 8 mm diameter. The filter assembly has a resistance to draw (RTD) of 2.5" $H_2O$ when tested at an air flow velocity of 1050 cc/min. The filter assembly was attached by means of a paper overwrap to an 85 mm length University of Kentucky 1R1 Reference cigarette. The overall cigarette and filter combination had an RTD of 5" water. The characteristics of the University of Kentucky 1R1 Reference cigarette are delineated in a research bulletin entitled "The Reference Cigarette", published by the University of Kentucky, Aug. 29, 1969.

The cigarettes were then packaged in a standard 20 cigarette package. The packaging consisted of an inner layer of metalized foil paper, a coated paper overwrap, and an outer wrap of polypropylene film of 0.8 mil thickness. The sealed packages of cigarettes were stored at 25° C. for two weeks prior to testing of the cigarettes.

For comparison purposes, cigarettes were prepared and packaged in a similar manner but with the following exceptions:

Control A—Contained a filter wherein the silica gel was not treated with peroxide solution.

Control B—Contained a filter wherein the silica gel was treated with a peroxide solution containing no pyrrolidone stabilizer.

Control C—Contained a filter wherein, instead of untreated silica gel granules as in Control A, there was employed 260 milli grams of untreated 20/40 mesh activated carbon granules.

Control D—Contained, instead of a plug-space-plug filter, an integral 20 mm length of cellulose acetate fiber filter rod.

Following the two weeks of aging in sealed packages, the cigarettes were tested by the following method:

Two aged cigarettes were simultaneously smoked on an electric smoking machine by drawing air through the lit cigarette in puffs of 2 seconds duration, 35 cc of air/puff, and permitting 60 seconds of static burn between puffs. The smoke from 8 puffs was passed through a Cambridge filter pad to remove TPM. The resultant gas phase of the smoke was combined through a common manifold and collected in a previously evacuated one meter infrared gas cell. The gas in the cell was then subjected to an infrared spectroanalysis, using a Perkin-Elmer 221 infrared spectrophotometer with ordinate scale expansion. Three replicate samples were taken. The absorption band at 8.9 microns wavelength represents the acetaldehyde content of the smoke. The absorption band at 11.2 microns represents the isoprene content of the smoke. The analytical data obtained is reported in Table 1.

TABLE 1

| | Isoprene µg/cigt. | Acetaldehyde µg/cigt. | % Reduction of Acetaldehyde* | Ratio** |
|---|---|---|---|---|
| Filter of this Example | 652 | 252 | 78 | 26 |
| Control A | 661 | 905 | 21 | 10.5 |
| Control B | 658 | 721 | 37 | 18.5 |
| Control C | 330 | 504 | 56 | 1.1 |
| Control D | 672 | 1145 | 0 | |

*Based upon the acetaldehyde content of Control D
**% reduction of acetaldehyde/% reduction of isoprene As the data of Table 1 indicates, the combined presence of peroxide and stabilizer is necessary to achieve a significant reduction of the acetaldehyde content of cigarette smoke. Peroxide alone, as in Control B, is effective in removing acetaldehyde, but its effectiveness is not as great as the combined effect of peroxide with stabilizer. Isoprene, an unsaturated hydrocarbon constituent of smoke, is shown to be substantially unaffected by the peroxide filter. Other unsaturated trace components, such as ethylene and acetylene were also found to be unaffected by the peroxide filter. Although activated carbon removes an appreciable amount of acetaldehyde, its effect is nonselective, as evidenced by its absorption of isoprene and numerous other components of the gas phase of cigarette smoke.

EXAMPLE II

Granular microporous ethylene glycol-dimethacrylate polymer having a mesh size of 50–80 (Porapak N, manufactured by Waters Assoc., Inc. of Framingham, Mass.) was saturated to the point of run-off with each of the following solutions:

(A) 30% $H_2O_2$.
(B) 30% $H_2O_2$ containing 5% N-methyl-2-pyrrolidone.
(C) 30% $H_2O_2$ containing 5% polyvinylpyrrolidone (type NP-K30, GAF Corp., New York, NY)
(D) 30% $H_2O_2$ containing 5% polyvinylpyrrolidone (type NP-K30) and 10% sodium metaborate.

In each of the treated samples, the granular microporous polymer absorbed about 180% of its dry weight of the treating solution. The treated granular polymer samples were then dried in a vacuum desiccator over anhydrous calcium sulfate. The dried samples were free-flowing materials containing 23% $H_2O_2$ which in turn contained 6% by weight of residual water.

The filter materials were tested by loading 110 mg of each into a space 7 mm long bounded by two 7 mm length plugs of the cellulose acetate tow rod employed in Example I. The filter assembly was wrapped with a standard tipping paper, forming a cylindrical filter of 21 mm length and 8 mm diameter. The filters were attached by means of a paper overwrap to an 85 mm length University of Kentucky 1R1 Reference cigarette. The overall cigarette and filter combination had an RTD of 6.5" water. Included in the test series was a cigarette made in the same manner as sample A but with omission of treatment with hydrogen peroxide. This control sample was labelled E.

Employing the smoke analysis method of Example 1, the results of Table 5 were obtained. For comparison purposes, the isoprene and acetaldehyde deliveries of the 1R1 cigarette with a 20 mm cellulose acetate filter rod are presented as Sample F.

TABLE 2

| Sample | Isoprene µg/cigt. | Acetaldehyde µg/cigt. | % Reduction of Acetaldehyde* | Ratio** |
|---|---|---|---|---|
| A | 578 | 0 | 100 | 7 |
| B | 564 | 69 | 94 | 6 |
| C | 618 | 57 | 95 | 12 |
| D | 634 | 229 | 80 | 14.5 |
| E | 558 | 824 | 28 | 1.6 |
| F | 672 | 1145 | 0 | |

*Based upon the acetaldehyde content of Control F.
**% reduction of acetaldehyde/% reduction of isoprene.

The same series of cigarettes was also subjected to a test of smoke filtration efficiency which determines the total aldehyde content of the gas phase of the smoke. In said test, the smoke from 5 cigarettes is led through a Cambridge filter pad to remove total particular matter, and the effluent gas phase of the smoke is bubbled through a scrubbing solution wherein aldehydes react with MBTH to provide a colored reaction product. Colorimetric analysis then determines the aldehyde content. This method is further described in Sawicki, E., Anal. Chem. Vol. 33, No. 1, January, 1961. Based upon the total aldehyde method of analysis, the data of Table 3 were obtained:

TABLE 3

| Sample | Aldehydes µg/cigt. | % Reduction in Aldehydes* |
|---|---|---|
| A | 157 | 87 |
| B | 109 | 91 |
| C | 48 | 96 |
| D | 326 | 73 |
| E | 907 | 25 |

TABLE 3-continued

| Sample | Aldehydes μg/cigt. | % Reduction in Aldehydes* |
|---|---|---|
| F | 1209 | 0 |

*Based upon the aldehyde content of Sample F.

The results of this Example establish that the use of the liquid stabilizer, N-methyl-2-pyrrolidone, or a film-forming stabilizer, polyvinylpyrrolidone (type NP-K30) enhances the stability and effectiveness of the peroxide-containing filter.

EXAMPLE III

Some expanded, open pore perlite of 20/40 mesh (U.S. Gypsum Co.) was impregnated with a solution of 0.5 gram N-methylcaprolactam in 11 grams of 30% $H_2O_2$ until the perlite absorbed 5.5 times its dry weight of the peroxide solution.

The impregnated perlite was then dried in a vacuum desiccator over anhydrous calcium sulfate. The dried, treated material contained 5% residual moisture, and contained an absorbed liquid phase consisting of N-methylcaprolactam containing 43% $H_2O_2$.

The peroxide-containing perlite granules were tested by the method of Example 1 for efficiency of cigarette smoke filtration. The removal of acetaldehyde was 58%. The removal of isoprene was about 1%. The ratio of % acetaldehyde removal/% isoprene removal is therefore about 58.

EXAMPLE IV

Replacing the N-methylcaprolactam of Example III with polyvinylpyrrolidone, peroxide-containing perlite granules were also utilized for the preparation of a dry detergent-bleach powder having the following formulation:

| | Parts by Weight |
|---|---|
| Sodium dodecylbenzene sulfonate | 22 |
| Sodium tripolyphosphate | 30 |
| Monoethanolamide of coconut oil fatty acid | 2.5 |
| Sodium silicate | 7 |
| Magnesium silicate | 1 |
| $H_2O_2$/Perlite granules of this Example | 6 |

The mixture was found to provide acceptable bleaching action even after prolonged storage at room temperature.

EXAMPLE V

A granular microporous material was prepared from polystyrene in the following manner:

2.0 grams of "Cartafix" U (an agglomerating agent sold by the Sandoz-Chemical Co.) was dissolved in 40 cc distilled water. This solution was slowly added with stirring to 3 grams of a nonfilm-forming polystyrene latex (U-2006 sold by the Staley Mfg. Co., of Cambridge, Mass.) containing 40% solids. The mixture was adjusted to pH 5.6 using dilute HCl, and was placed in an oven maintained at 80° C. for 4 hours. A coherent monolith structure was produced from the liquid mixture. The monolith was ground in a Waring Blender using enough water to form a stirrable slurry. The slurry was wet-sieved to produce 20-40 mesh granules. The dry granules were found to have a pore volume of 1.7 cc/gram.

Some of the microporous polystyrene was impregnated to saturation with a solution made by dissolving one part polyvinylpyrrolidone (Type NP-K30) in 22 parts of 50% aqueous $H_2O_2$. The impregnated granules were dried to constant weight at 75° C. over Drierite to provide an add-on of 120%. The granules contained 85% by weight of $H_2O_2$.

The peroxide-containing granules were loaded into cigarette filters, using 85 mg of the granules per filter. The filter consisted of two 6 2/3 mm length, 8 mm diameter cellulose acetate tow rods coaxially spaced 6-2/3 mm apart, into which space the granules were placed, the entire longitudinal extent of the assembly being enveloped by a paper wrapper. The filter was affixed to a Kentucky 1R1 tobacco rod to produce a cigarette having a 5"RTD. The cigarettes thus prepared were stored at room temperature for three weeks prior to analysis. Upon smoking and analysis of the resultant smoke, it was found that cigarettes containing the filter of this example delivered 81% less acetaldehyde than the Kentucky 1R1 cigarette with a conventional 20 mm length acetate tow filter.

EXAMPLE VI

One part of silica gel (Grade 59, Davison Co., Baltimore) having a 20/40 mesh size was impregnated with 2.9 parts of a solution consisting of 5.5 parts of a 50% solution of $H_2O_2$ in water, and 0.9 parts of zinc acetate. The impregnated silica gel was divided into three portions, labeled A, B and C, which were accurately weighed and placed in a desiccator at room temperature containing anhydrous calcium sulfate ("drierite," a product of the Hammond Co. of Ohio). The granules at this stage cling together and have very poor bulk flow properties.

Sample A was removed from the desiccator after several days standing and was reweighed. It had lost weight in an amount representing 62% of the initial weight of the impregnating solution. Since the only volatile species are $H_2O$ and $H_2O_2$, and since the water is considerably more volatile than the peroxide, it can be calculated that all the water and 46% of the peroxide had left the granules. The residual peroxide is essentially water free, existing as a 62% solution in the zinc acetate, and the total $H_2O_2$ content of the granules is 34%.

By allowing Samples B and C to reside in the desiccator for longer periods of time, it was found that Sample B contained 22% $H_2O_2$ at a concentration of 45%, and Sample C contained 10% $H_2O_2$ at a concentration of 32%. The samples also show evidence of containing zinc peroxide $ZnO_2$. When evaluated by the method of Example I for activity on cigarette smoke, the following reductions in aldehyde content were obtained: A=100%, B=100%, C=55%.

When the preferred granular compositions of this invention are used to fill a compartment space in a plug-space-plug filter configuration, the bulk flow or pouring properties of the compositions is of considerable importance. The bulk flow properties of the filter material of this invention can be measured by means of a stainless steel funnel having a 0.95 cm diameter opening at the bottom to meet ASTM Specification D 1895-67T Method A. A sample weighing 140 g is placed in the funnel. The time in seconds is recorded for the sample to flow out of the funnel. By this test method, the preferred filter materials of this invention have flow times less than about 45 sec/140 g. In some cases, where the granules contain more than about 80% of added hydrogen peroxide, the flow time is infinite. This occurs primarily because of bridging within the sample, which halts flow. Samples A, B and C of this Example possessed flow times of about 24 seconds.

In order to ascertain whether any hydrogen peroxide of the filter material enters into the smoke stream of a cigarette, filter B of this Example was selected for testing by infrared methods of analysis. Because cigarette smoke contains a large number of compounds, trace quantities of a compound such as $H_2O_2$ might not be readily ascertainable therein. Therefore, instead of analyzing actual smoke for possible content of hydrogen peroxide, air was drawn through filter assemblies disassociated from cigarettes, in a manner such as to simulate the mode of air passage during the usual smoking of a cigarette. Three different tests were conducted:

(1) Eight 35 cc puffs of air of two seconds duration each were drawn through the filter assembly devoid of tobacco rod. The resultant air was subjected to infrared spectrophotometric analysis by the methods and techniques described above. The infrared spectrum was compared with that described in the *Journal of Chemical Physics*, Vol. 18, p. 88 (1950). No trace of hydrogen peroxide was found.

(2) 140 cc of air was drawn through five of the filter assemblies placed in a rosette-type cigarette holder. The resultant air was analyzed with an infrared spectrometer which utilizes an interferometer scanning system (Model FTS-14, Digilab Co. of Cambridge, Mass.). No trace of hydrogen peroxide was found.

(3) Several grams of the granular filter material itself was placed in a sealed 200 cc glass flask. The flask was heated to 60° C. and the headspace gas was transferred to an evacuated gas cell. Five sets of I.R. spectra of four scans each (6 secs/scan) were collected immediately using the FTS-14 instrument. No trace of hydrogen peroxide was found.

To further establish the absence of volatile hydrogen peroxide, filter C of this Example was tested in the following manner:

Eight 35 cc puffs of air of two seconds duration each were drawn through the filter assembly devoid of tobacco rod and mounted in a standard holder for a Cambridge filter pad. The downstream end of the filter was positioned 10 mm from the Cambridge pad, to which was adhered a piece of moistened starch-iodide test paper.

No coloration was recorded on the test paper. When a comparable sample of air was drawn from the headspace of a bottle of commercial grade 30% $H_2O_2$ at room temperature, the test paper turned to a dark purple color.

As noted above, U.S. Pat. No. 3,911,080 described a system comprising a solution of hydrogen peroxide encased in a semipermeable membrane which is impervious to liquids but permeable to gases. This system suffers from the disadvantage that it is useful only for purifying a small amount of gas phase in a given time frame. It is specifically disclosed therein that the system must remain in contact with the gas phase for a time sufficient to allow permeation of the gases through the outer membrane, reaction with the hydrogen peroxide and permeation back to the gas phase. Obviously, such a system would not be suited for the purification of large volumes of gas phase over short periods of time. It is theorized that the semi-permeable membrane is necessary to protect or stabilize the hydrogen peroxide in the system described in U.S. Pat. No. 3,911,080.

In any event, the presence of the stabilizer in the substrate of the present invention does away with the requirement for the semi-permeable membrane envelope. It has been found that the granular materials of the invention are capable of removing aldehydes from a gas stream containing from 0.01% to about 2%, by volume, of aldehydes, moving at a rate such that duration of contact with said granules may be as low as 0.03 second. Larger contact durations may be achieved utilizing different flow rates or different geometrical configurations of the granular bed, especially long cylindrical beds.

What is claimed is:

1. A filter element for selectively removing, rapidly and effectively, lower molecular weight aldehyde and related components from a gas stream containing unsaturated hydrocarbon components without substantially affecting such hydrocarbon components as does activated carbon, having a substrate consisting essentially of granules of a porous carrier, said carrier granules containing hydrogen peroxide, about one to ten percent water based on the weight of hydrogen peroxide, and a hydrophilic stabilizer for said hydrogen peroxide.

2. The filter element of claim 1 wherein said carrier has granules of a size between 10 and 100 mesh and a pore volume between 0.1 and 2.5 cc per gram.

3. The filter element of claim 2 wherein said granules have a size between 20 and 60 mesh.

4. The filter element of claim 1, said carrier containing from about 2% to about 60%, by weight, of hydrogen peroxide.

5. The filter element of claim 1 wherein said hydrogen peroxide constitutes from about 20% to about 90% by weight of the combined peroxide, water, and stabilizer.

6. The filter element of claim 1 wherein said carrier is silica gel.

7. The filter element of claim 1 wherein said stabilizer is an N-substituted lactam or N-acylated cyclic base.

8. The filter element of claim 1 wherein said stabilizer is polyvinylpyrrolidone, a diketopiperazine or a compound having the structure:

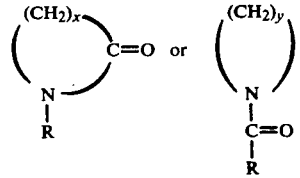

wherein R is a straight or branched chain alkyl radical having 1 to 4 carbon atoms which may be substituted with one or more halogen atoms, hydroxy or alkoxy groups having 1 to 3 carbon atoms, x is 2, 3, 4 or 5, and y is 3, 4 or 5.

9. The filter element of claim 1 wherein said stabilizer is a water-soluble film-forming polymer.

10. The filter element of claim 1 wherein said stabilizer is zinc acetate.

* * * * *